United States Patent [19]
Lindsay

[11] Patent Number: 4,964,607
[45] Date of Patent: Oct. 23, 1990

[54] HEIGHT ADJUSTABLE PLATFORMS

[75] Inventor: Richard A. Lindsay, Gislingham, United Kingdom

[73] Assignee: Vinten Group plc, Bury St. Edmunds, United Kingdom

[21] Appl. No.: 310,765

[22] Filed: Feb. 14, 1989

[30] Foreign Application Priority Data

Feb. 19, 1988 [GB] United Kingdom ............... 8803879

[51] Int. Cl.$^5$ .................................... F16M 13/00
[52] U.S. Cl. ................................ 248/421; 108/144; 297/345
[58] Field of Search ............ 248/421, 166, 562, 580, 248/584, 669, 132, 161, 162.1, 411, 413, 157, 163.1, 164, 432, 168, 169, 436, 439, 178, 279; 108/144, 141, 69, 157, 145; 297/345; 52/645, 646

[56] References Cited

U.S. PATENT DOCUMENTS

| | | | |
|---|---|---|---|
| 797,077 | 8/1905 | Shaw | 248/421 |
| 1,947,647 | 2/1934 | Holden | 304/29 |
| 2,080,441 | 5/1937 | Shoop | 108/145 |
| 2,440,096 | 4/1948 | Jury | 248/421 |
| 3,160,228 | 12/1964 | De Witt Steed | 108/144 |
| 3,672,104 | 6/1972 | Luckey | 52/646 |
| 3,796,282 | 3/1974 | Denier | 108/145 |
| 4,115,975 | 9/1978 | Bliss | 52/646 |

FOREIGN PATENT DOCUMENTS 56793 7/1936 Norway ........................ 108/144

Primary Examiner—Ramon O. Ramirez
Assistant Examiner—Robert A. Olson
Attorney, Agent, or Firm—Lee, Mann, Smith, McWilliams & Sweeney

[57] ABSTRACT

A height adjustable load carrying platform (7) wheel mounted for steering or crabbing movement and comprising at least three concertainable lazy tongs lattices of struts (5) forming a 3 sided pyramid which can be raised and lowered manually or under power, and includes a counterbalance mechanism (67). The structure replaces a conventional pedestal support for a camera or the like (such as T.V. camera) and is capable of being extended up to normal pedestal height, but is also capable of contracting to a lower minimum height than that of a conventional pedestal. Three and four axis hinges are described to permit the articulation at the corners.

13 Claims, 3 Drawing Sheets

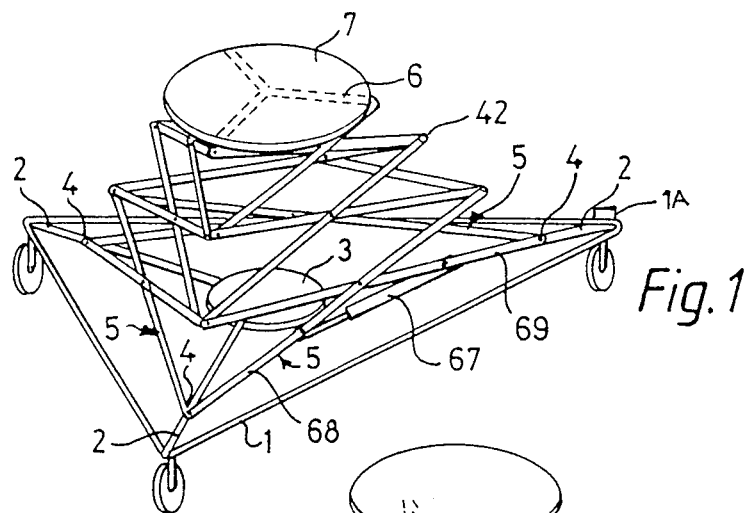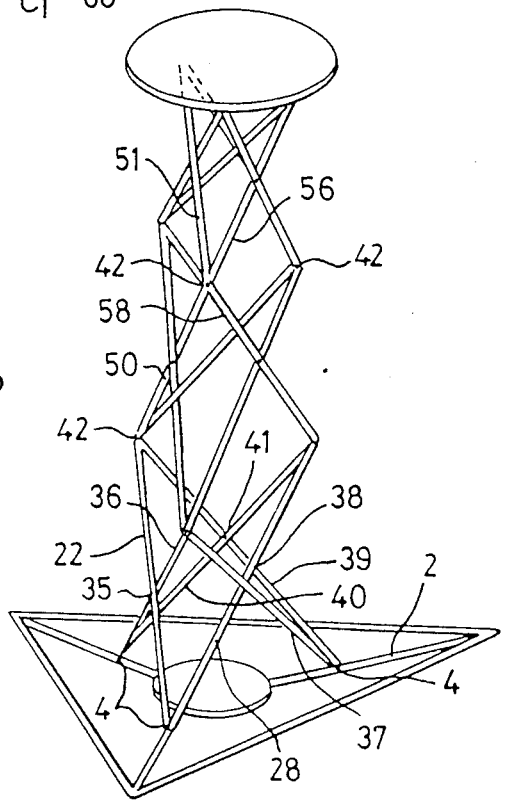

HEIGHT ADJUSTABLE PLATFORMS

FIELD OF INVENTION

This invention relates to height adjustable platforms particularly, although not exclusively, to height adjustable platforms for the mounting of television cameras and the like.

BACKGROUND TO THE INVENTION

Many adjustable platforms are available for this use. Some, such as pedestals comprise a column including a counterbalancing mechanism wherein the load located on a platform at the top of the pedestal, is counterbalanced to reduce the force required in particular to raise the platform. The counterbalancing may be achieved pneumatically, hydraulically or mechanically as by a spring, but the minimum height at which these devices operate is dependent on the minimum height to which the column can be reduced as by the telescoping. Generally speaking such pedestals are very successful for medium and heavy weight applications but are not readily scaled down, for use with lightweight equipment. Furthermore the minimum height is too high for many applications and there is a requirement for an extendable platform which will maintain rigidity up to the heights associated with pedestals and yet will be capable of achieving a lower minimum height.

Scissor mechanisms such as "lazy tongs" have been proposed for height adjustable platforms. Such devices are relatively rigid but there is a problem in that a relatively large size of platform is needed so that if equipment is to be mounted thereon which is to be capable of tilting, it has a very restricted tilt angle. For large tilt angles it is essential that the platform is as small as possible.

It is therefore an object of the present invention to provide a height adjustable platform wherein the aforementioned problems are at least substantially reduced.

SUMMARY OF THE INVENTION

According to the invention a height adjustable support for a load carrying platform comprises a generally pyramidal framework wherein each side is made up of a plurality of lazy tongs frameworks, with the struts forming the sides of the triangulations becoming progressively shorter in length, from the base to the load carrying platform, each of the side struts being hinged to its neighbouring element and to at least two other struts in adjoining triangulations on adjoining sides of the structure, to enable the structure to concertina, wherein each hinge accommodates the change in true angle of the corners of the pyramidal structure as the hinged frameworks extend and contract.

The pyramidal support structure may have a triangular base, with each of the three sides of the triangular base equal in length to the other two.

The support structure may be provided with wheels or castors to provide mobility.

The support structure may advantageously contain drive means for controlling the steering of one or all of the wheels or castors, thereby permitting tricycle steering or crabbing if required.

The structure may be it may be power operated using pneumatic, hydraulic or electric motors.

The support structure and the load carrying platform may be counterbalanced by using a load compensating device such as a spring, or an airspring between for example one or more struts and the base or between two of the struts.

The invention will now be described, by way of example with reference to the accompanying drawings in which:

FIG. 1 shows a height adjustable platform embodying the invention in the partly raised condition;

FIG. 2 shows the height adjustable platform of FIG. 1 in its fully raised condition;

Figure 3:
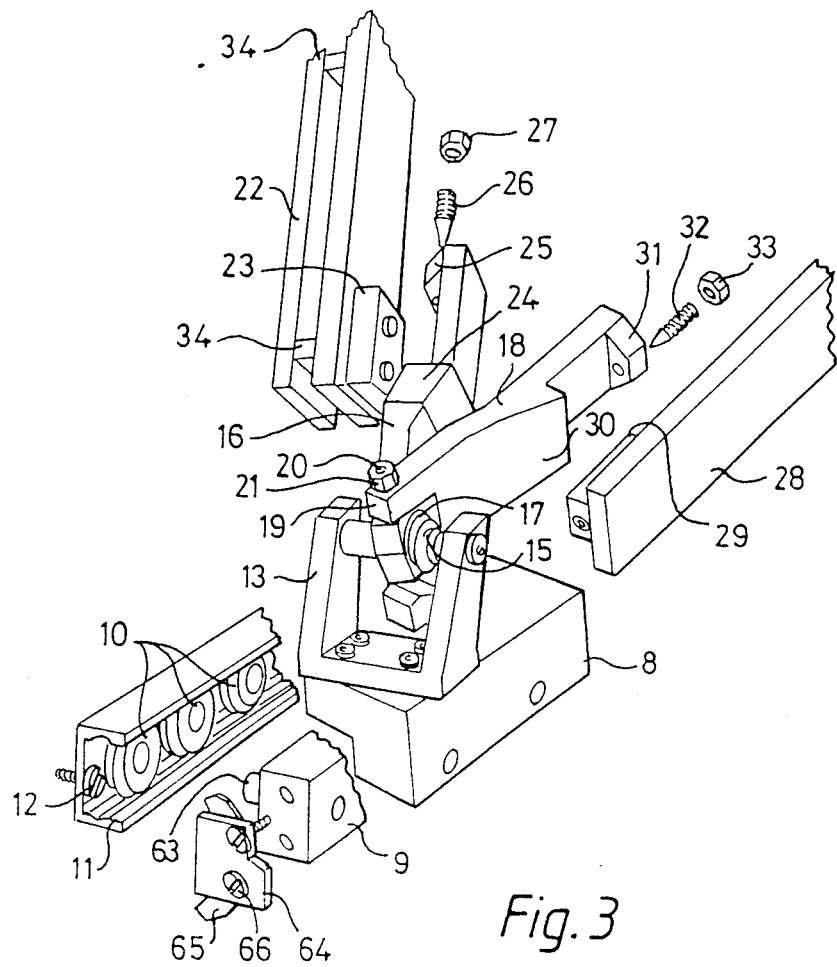
FIG. 3 shows a lower joint and linear guide.

Referring to FIG. 1 a triangular framework (1) of equal length sides has three guide rails (2) each bisecting one corner and jointed to a central plate (3).

The framework (1) has a castor type wheel fitted at each corner so that the framework may be crabbed, or steered by drive means (1) in a tricycle fashion.

The guide rails (2) include linear bearings more clearly shown in FIG. 3 and described later. A three sided pyramidal lattice structure formed from interconnected lazy tongs lattices of struts (5), each hingedly attached to the other two to form a variable height pyramid, is hinged at its three base corners to runners (4) and is similarly hinged to runners or linear bearings (6), (shown dotted) on the underside of a mounting plate (7) upon which for example a pan and tilt mounting may be fitted, for supporting a camera (not shown).

FIG. 2 shows the arrangement after the runners (4) have moved along the rails (2) thereby raising the mounting plate. Due to the complex movement of the lattice pyramid at the joints, each hinge has to accommodate the change in true angle of the pyramid corners as the lattice of struts is extended or contracted.

To achieve this three and four axis hinging is necessary at the junctions between the struts to permit the smooth transition of the mounting plate (7) from its lowest position to its fully extended position. To this end hinges such as shown in FIGS. 3 and 4 have been devised to permit such multi axis hinging.

Figure 4:
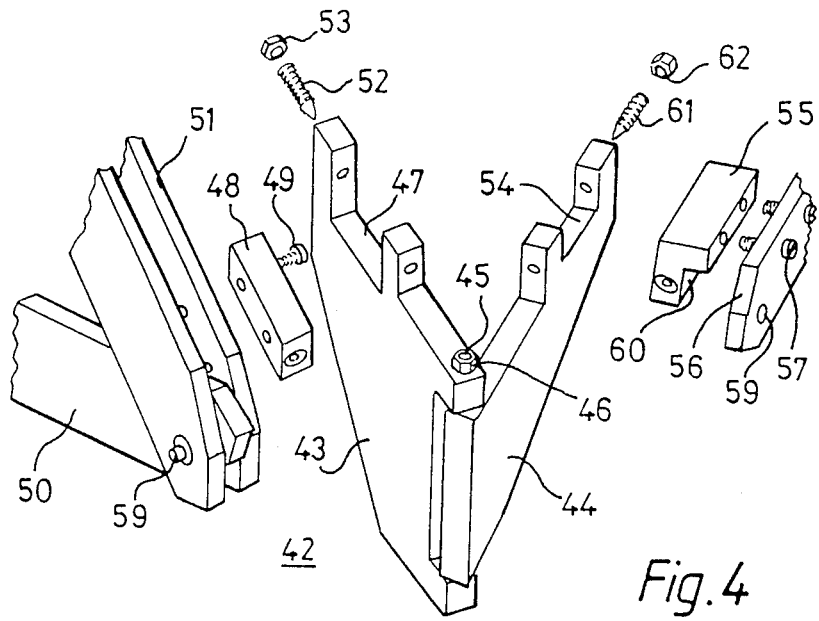
FIG. 4 shows an intermediate hinge.

Referring to FIG. 3 a block (8) is fixed to roller mount (9) for rolling engagement via rollers (10) on guide rails (2) to which guides (11) are secured as by screws (12). A generally "U" shaped bracket (13), fixed to block (8) at an angle to the direction of movement, as by screws (14), includes a universal ball joint (15) pivoted between the upwardly extending sides of the bracket.

A first arm (16) has a hole (17) in one end to receive the socket of ball joint (15) and is universally rotatable relative to bracket (13).

A second arm (18) has a generally "U" shaped slot (19) in one end and is pivoted by pivots (20) to the first arm (16).

The pivots (20) may be adjusted and locked by a locknut (21).

A double lath (22) having a pivot block (23) fitted to one side at one end thereof is pivoted in the first arm (16) between abutments (24) and (25).

A screw (26) is adjustable within abutment (25) and can be locked using locking (27) to provide a pivot point.

A single lath (28) having a pivot block (29) attached to the side on one end is pivotally located between abutments (30) and (31). A second screw (32) adjustable within abutment (31) can be locked using locknut (33) to provide another pivot point.

It will be noted that lath (22) is a double with the two laths spaced apart as long spacers (34). This provides stability for pivot (35) at which single lath (30) (FIG. 2) is pivoted.

Lath (28) is a single element member and is pivoted between a double lath (37) at pivot point (38) as is also lath (39) which is pivoted between double lath (40) at pivot (41). This increases stability by reducing the torque in the laths.

In FIG. 4 there is shown an intermediate hinge (42) having a first arm (43) which has a generally "U" shaped recess for pivotal reception of a second arm (44). Pivots (45) may be adjusted and then locked as by locknut (46). Arm (43) is formed with a second generally "U" shaped recess (47) for pivotal reception of pivot block (48) which may be secured to the side of a double lath, such as the opposite end of lath (22), as by screws (49). In fact, as drawn, the block (48) is shown as the intermediate hine of single lath (50) and double lath (51) of FIGS. 2 and 4.

The pivot for block (48) is adjustable using pivot screw (52) and is locked in position using locknut (53). A generally "U" shaped recess (54) in arm (44) provides a pivot joint for rebated block (55) which is securable to a single lath (which may be lath (56) of FIG. 2), as by screws (57).

A double lath such as lath (58) in FIG. 2, is pivotally attached to single lath (56) by a point pin (59) in the manner shown by the join of laths (50) and (57). The rebate (60) in block (55) provides the space for the inside lath of the double lath, to fold into the closed position. Rebated block (55) is pivotally mounted in recess (54) using pivot (61) which is adjusted and then locked by locknut (62).

Referring again to FIG. 3, rollers (10) are free to rotate on pivot pins (63) which extend from roller mount (9) and are retained as by Circlips (Reg. Trade Mark) or any convenient fixing means.

A plate (64) serves to secure a cleaning pad of plastics material (65), one to each end of roller mount (9) as by screws (66) to ensure smooth running along guides (11).

Other methods of hinging the corners of the lattice structure may be used, provided they provide at least three axis hinging for the intermediate joints and at least four axis hinging where the lattice joins the base and mounting plate. The mounting plate joints are essentially the same as the base joints, but require less travel, since the movement of the lazy tongs triangulations at the upper end is less than that at the base.

Lastly, referring again to FIG. 1 a counterbalancing device in the form of an airspring (67) is shown connected between two of the struts (68) and (69) of one of the lazy tongs. The airspring is selected and if appropriate adjusted so as to just balance the tendency of the structure to collapse under its weight when the camera or other load is in position.

In order to provide a more even spread, the single load balancing device (67) may be replaced by three, one between each of three similar pairs of struts in each of the three series of lazy tongs triangulations.

I claim:

1. A height adjustable support for a load carrying platform comprising a base, and a generally pyramidal framework made up of a plurality of lazy tong struts which become progressively shorter in length from the base to the load carrying platform, each strut being connected to a strut in an adjoining side of the structure by hinge means to enable the support to concertina, and each hinge means additionally incorporating pivotal means to allow a strut to rotate about an axis which is substantially vertical when the platform is at its lowermost position, whereby each hinge accommodates changes in true angle between adjoining struts as the platform is raised and lowered.

2. A height adjustable support as claimed in claim 1 wherein said base is triangular, and each of the three sides of the triangular base is equal in length to the other two.

3. A height adjustable support as claimed in claim 2 wherein the support is provided with wheels or castors to provide mobility.

4. A height adjustable structure as claimed in claim 2 where the structure is counterbalanced using spring means or pneumatic or hydraulic devices.

5. A height adjustable support as claimed in claim 1 wherein the support is provided with wheels or castors to provide mobility.

6. A height adjustable structure as claimed in claim 5 where the structure is counterbalanced using spring means or pneumatic or hydraulic devices.

7. A height adjustable support as claimed in claim 5 wherein the support structure contains driver means for controlling the steering of one or all of the wheels or castors thereby permitting tricycle steering or crabbing.

8. A height adjustable structure as claimed in claim 7 where the structure is counterbalanced using spring means or pneumatic or hydraulic devices.

9. A height adjustable structure as claimed in claim 1 where the structure is counterbalanced using spring means or pneumatic or hydraulic devices.

10. A height adjustable structure as claimed in claim 9 wherein the raising and lowering is power operated using pneumatic, hydraulic or electric motors.

11. A height adjustable structure as claimed in claim 9 wherein the platform is counterbalanced by means of a spring between one or more struts and the base.

12. A height adjustable structure as claimed in claim 11 wherein the platform is counterbalanced by means of a spring between two of the struts.

13. A height adjustable structure as claimed in claim 11 wherein the spring is an airspring.

* * * * *